Nov. 1, 1960  J. C. RABIER  2,958,823
VOLTAGE COMPARATOR
Filed March 13, 1956  2 Sheets-Sheet 1

X IS WITHIN TOLERANCE LIMITS   X IS TOO HIGH

X IS TOO LOW

INVENTOR.
JEAN C. RABIER
BY
George S. Hastings
ATTORNEY.

INVENTOR.
JEAN C. RABIER
BY
George S Hastings
ATTORNEY.

United States Patent Office 2,958,823
Patented Nov. 1, 1960

2,958,823

VOLTAGE COMPARATOR

Jean C. Rabier, Pomona, Calif., assignor, by mesne assignments, to The Marquardt Corporation, a corporation of California Filed Mar. 13, 1956, Ser. No. 571,287

5 Claims. (Cl. 324—133)

This invention relates to a voltage comparator which automatically compares an unknown voltage with two reference voltages. More particularly, the invention discloses the voltage comparator in which the magnitude of the unknown voltage is compared with the predetermined maximum and minimum voltage limits which constitute the acceptable voltage tolerances for passing or rejecting as unacceptable the unknown voltage, or the voltage under test.

The disclosed voltage comparator may produce two types of indications in the course of indicating as to whether the voltage under test is within the acceptable high and low voltage limits. One type of indication may merely produce a "yes" or a "no" indication, the "yes," or "go" indication, meaning that the tested voltage is within the high and low voltage limits, and the "no." or "no go," indication meaning that it is either too high or too low and, therefore, is not acceptable for the intended purpose. The second type of indication may produce a "yes" signal when the unknown voltage is within the limits, a "too high" signal when X, the unknown voltage, exceeds the maximum limit, and "too low" signal when the unknown voltage X is lower than the minimum limit.

The comparators of this type are used for any automatic testing of an electronic equipment such as testing of circuits in radio sets, television sets, and any other electronic or electrical apparatus where, for example, a fixed and known voltage should produce fixed and known voltage drops in, or across, some electrical circuit, circuits, or parts of circuits, such voltage drops being used for ascertaining proper functioning of such circuits. The above readings or indications are obtained with the aid of a resistance network, two synchronized choppers, one chopper being on the input side and the other on the output side of an alternating current amplifier, and two relays which actuate pilot lights producing the above indications.

According to the known voltage testing systems, the following steps are necessary for obtaining the above results: in the first step, the unknown voltage X is compared with the aid of resistance matrices with a known reference voltage E which produces a voltage signal proportional to X—E, or a difference between the unknown voltage X and the reference voltage E. In such voltage comparator systems, voltage E must be a stable voltage in order to function properly. The second step in the above system is to amplify the difference X—E in a direct current amplifier (with or without chopper on the input side of the amplifier) which must have a constant and known gain, $g$, in order to obtain the desired final readings. The outputs of the amplifier produce a voltage equal to $g(X-E)$. The third step involves the comparison of this amplified difference with the positive and negative absolute limits of the tolerance voltages $e^+$ and $e^-$, which are multiplied by the same gain $g$ to produce the voltages $ge^+$ and $ge^-$. This comparison is obtained in two comparator circuits where the following inequalities must be satisfied:

$$g(X-E) < ge^+ \quad (1)$$
$$g(X-E) > ge^- \quad (2)$$

or $$X-E < e^+ \quad (3)$$
$$X-E > e^- \quad (4)$$

Two comparators are used for checking the two inequalities separately, one checking inequality (1) and the other inequality (2). The output of each comparator is connected to its respective relay, which closes the normally open contacts of the "no go" circuit when the resulting output signals energize either of the two relays. This happens when the output of either comparator is high enough to energize its respective relay. Sometimes these relays are used as comparators, since they require a given voltage for their closing.

The disadvantages of the above comparator circuit are: the system must have a stable direct current amplifier with known gain; the relays may give a false indication, or a "go" signal in case of failure of any part of the tester, such as defect in continuity or a failure of an amplifier; the system also requires three distinct voltage comparisons which are: (a) X voltage is compared against the reference voltage E; (b) the difference $g(X-E)$ is compared against the allowed high tolerance voltage $ge^+$, and (c) the same difference $g(X-E)$ is compared against the lower tolerance voltage $ge^-$. The above series of limitations obviously limit the usefulness and reliability of such systems. It may be mentioned here that systems are also known which make only one comparison, such as $$g(X-E) < ge^+ \text{ or } g(X-E) > ge^-$$

with the addition of one more limitation to those enumerated above.

According to the invention, the reference voltage and the unknown voltage are connected to a common resistance network which is provided with a chopper. The chopper connects the vibrating chopper armature first to one point and then to the other point on the resistance network. The potential impressed on the armature at one poin is proportional to the voltage $[X-(E+e^+)]$, while the potential impressed on the armature when it is connected to the other point is proportional to the voltage $[X-(E-e^-)]$. These voltage differences are then impressed on an alternating current amplifier, the output of which is connected to a second chopper synchronized with the first chopper. The armature of the second chopper is connected to two parallel circuits each of which may or may not include a filter. This chopper is of the "make before break" type, in order, periodically, to clamp to ground the amplifier output between the two signal periods, and for obtaining stable and constant reference potential, which is the ground potential in this case.

A relay having two armatures is connected to each filter. When the unknown voltage is within the high and low limits, the two relays become energized and close the circuit of a pilot light indicating that the unknown voltage is within the selected voltage limits. When the unknown voltage is too high, one of the relays remains de-energized and the second armature of one relay then rests on its contact which energizes another light indicating that the voltage is too high. The same type of circuit is also provided when the voltage is too low.

It, therefore, follows that in the disclosed systems only two voltage comparisons are necessary, while in the prior systems, as stated previously, three voltage comparisons are necessary. The two voltage comparisons used by this invention are the direct comparisons with the high and low tolerance voltage limits. The above may be obtained by making the impedance ratio of the two parts of the resistance network connected to the reference voltage E and also connected to the unknown voltage X such as to produce the above high and low tolerance voltages.

The disclosed system does not require the use of a direct current amplifier having a very stable gain, but requires the use of only one alternating current amplifier, the gain of which does not affect the correctness of the readings to the same extent as is the case with the known systems. This is so because proper operation of the system depends only on the sign of the output pulse and not on its amplitude.

It is, therefore, an object of this invention to provide a voltage comparator in which the unknown voltage and the known reference voltage are impressed on a common resistance network for obtaining two signals indicating whether the unknown voltage is within the maximum and minimum acceptable limits which must be satisfied by the unknown voltage, these two signals being amplified in an alternating current amplifier and which produce appropriate intelligence signals for indicating whether the magnitude of the unknown voltage is within the desired limits.

It is also an object of this invention to provide a voltage comparator in which two separate intelligence signals are obtained by first producing the acceptable, or desired, low and high voltage limit signals, and then utilizing these two signals for producing three signals: "go" signal, indicating that the unknown voltage is within the limits, and "too high" or "too low" signals when the unknown voltage is outside the high and low limits.

Yet another object of this invention is to provide a voltage comparator in which the reference voltage and the unknown voltage produce two positive or negative voltage signals which indicate the acceptable voltage limits, these signals producing three indications, "go," "too low" and "too high," with the aid of two synchronized choppers, an alternating current amplifier, and two relays.

Another object of this invention is to produce a voltage comparator for a direct current voltage, the accuracy of which does not depend on the gain of an alternating current amplifier used in the comparator.

It is also an object of this invention to provide a comparator in which a comparison of an unknown voltage with a known voltage in a resistive network produces two signals, one signal having a higher magnitude than the other, the two signals producing a "go" visual signal when the unknown voltage is within the high and low tolerance limits, and two distinct "no go" visual signals when the unknown voltage is too low or too high, together with the corresponding "too high" or "too low" signal for indicating the nature of the error.

The novel features which are believed to be characteristic of the invention, both as to its organization and method of operations, together with further objects and advantages thereof, will be better understood from the following descriptions considered in connection with the accompanying drawings. It is to be expressly understood, however, that the drawings are for the purpose of illustration and description only, and are not intended as definitions of the limits of the invention.

Referring to the drawings.

Figure 1:
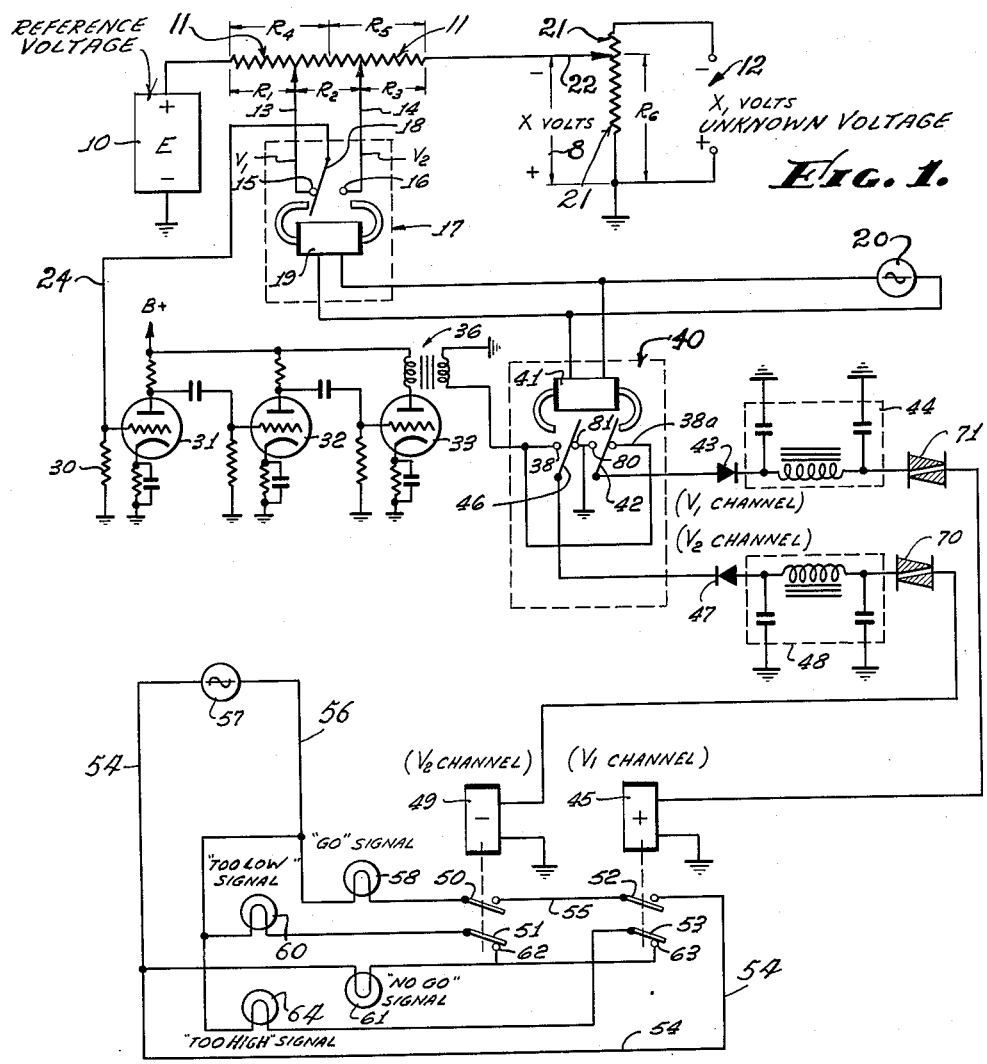
Fig. 1 is a schematic diagram of the comparator.

Referring to Fig. 1, a source of direct current reference voltage 10 is connected to one end of a resistor 11 while the unknown direct current voltage 12 is connected to the other end of the same resistor through a potentiometer or a voltage divider 21. Source 10 has its negative terminal grounded and its positive terminal connected to one end of resistor 11. Source 12 is connected across potentiometer 21, with the positive terminal of this source grounded and the potentiometer arm 22 connected to that point on the potentiometer 21 which is X volts below the ground potential, as indicated by an arrow 8 in Figure 1. Source 12 will be referred to hereafter as source $X_1$. Both resistances 11 and 21 are high resistances, in the order of 1 or 2 megohms, and, therefore, hardly draw any current from the sources E and $X_1$. Resistor 11 is provided with adjustable potentiometer arms 13 and 14 which have contacts 15 and 16 of a chopper, or switching means, 17 having an armature 18 and a coil 19 connected to a source of alternating current 20 for energizing the chopper coil 19. The source of reference voltage 10 may be a standard cell, furnishing a reference voltage which is of the order of one volt. As mentioned previously, resistance 11 may have a value of the order of 1 megohm; the value of resistance 11 is not critical, but it should be sufficiently high so as not to affect the values of E and $X_1$, which are the reference and the unknown voltages, respectively. Source $X_1$ may be connected directly to resistor 11 or through a voltage divider 21 when source $X_1$ is higher than source E. The voltage divider arm 22 should be set on the voltage divider 21 so as to produce a voltage of the same order of magnitude as the source E but of opposite sign at the potentiometer arm 22. The potentiometer arms 13 and 14 are positioned on resistor 11 so as to satisfy the following relations:

For arm 13:

$$\frac{R_2+R_3}{R_1}=1+\frac{e^+}{E} \qquad (1)$$

For arm 14:

$$\frac{R_3}{R_1+R_2}=1-\frac{e^-}{E} \qquad (2)$$

Where, in Fig. 1 or Fig. 5d, $R_1$ = resistance between source E and potentiometer arm 13.
$R_2$ = resistance between potentiometer arms 13 and 14.
$R_3$ = resistance between potentiometer arm 14 and potentiometer arm 22, or source X.

When the potentiometer arms 13 and 14 are positioned on resistor 11 in this manner, a voltage $V_1$ appears on arm 13 and voltage $V_2$ appears on arm 14. These two voltages are each equal to zero when the voltage X is equal to the following values:

$$V_1=0 \text{ when } X=E+e^+ \qquad (3)$$

and $$V_2=0 \text{ when } X=E-e^- \qquad (4)$$

where $V_1$ is the voltage produced on the potentiometer arm 13.
$V_2$ is the voltage produced on the potentiometer arm 14.
X is the voltage produced on the potentiometer arm 22 by the unknown voltage $X_1$; when $X_1 > E$, the potentiometer arm 22 is set so as to make X substantially equal to E.
$e^+$ is the admissible positive tolerance error in X.
$e^-$ is the admissible negative tolerance error in X.

Equations 1 and 2 are obtained from the solution of the equations for the network 11 when Equations 3 and 4 are satisfied.

When arms 13 and 14 are positioned on resistor 11 in the described manner, and voltage X is within the tolerance limits, the voltage signal appearing on a conductor 24 will have a positive rectangular wave 26 when armature 18 is on contact 15, a zero or ground voltage portion 27 when armature 18 is between the two contacts, and a negative rectangular wave 28 when armature 18 is on contact 16. Chopper 17, therefore, is of that type which leaves or opens connections with contact 15 before making contact with contact 16.

Armature 18 is connected through a conductor 24 to a grid resistor 30 which is also connected to the control grid of a triode 31. Triode 31 is biassed to operate as a class A amplifier. Accordingly, the rectangular pulses 26—28 will be amplified and will appear on the grids and in the plate circuits of triodes 32 and 33, which are capacitively coupled to triode 31, and are also class A amplifiers.

Figures 2, 3:
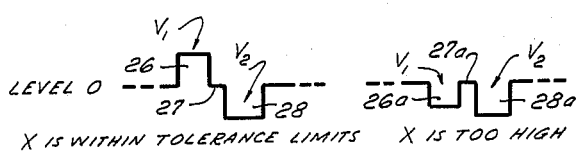
Figures 2 to 4 are oscillograms of signals produced in the comparator.
Figure 4:
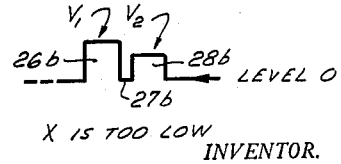

It is to be noted that conductor 24 is connected directly to the grid of triode 31 and is grounded through the grid resistor 30; therefore, the portion 27, Fig. 2, between the two rectangular waves 26 and 28, which corresponds to the zero potential, or the ground potential, introduced by the ground connection of grid resistor 30, acts as a reference voltage for the entire comparator circuit. It is necessary to provide the comparator circuit with a stable reference potential so that the positive and negative waves 26 and 28 always have correct sign throughout the measuring or comparing cycle. This "clamping" to ground voltage during part 27 (Fig. 2) also avoids any potential drifts at the grid of triode 31 and triodes 32 and 33.

An audio frequency transformer 36 is connected to the plate of triode 33 with one end of the secondary winding being grounded while the other end is connected to contacts 38 and 38A of a chopper 40 having its coil 41 connected to the source of alternating potential 20 so that the two choppers are synchronized in their operation.

The two choppers 17 and 40 must be synchronized so that when armature 18 in chopper 17 makes contact with contact 16, armature 46 makes contact with contact 38. Therefore, $V_2$ is impressed on rectifier 47 and relay 49, while $V_1$ is impressed on rectifier 43 and relay 45.

Armature 42 is conected to a rectifier 43, filter 44, a non-linear device 71, and a direct current relay 45 which completes the circuit of the secondary winding through ground when armature 42 is connected to contact 38A. The same type of circuit is provided for the armature 46 which is connected to a rectifier 47, a filter 48, a non-linear device 70, and direct current relay 49. Chopper 40 is also provided with contacts 80 and 81 which are connected to ground, and armatures 42 and 46 which normally rest, or make contact, with the grounded contacts 80 and 81 when the chopper coil 41 is not energized. Chopper 40 is of the "make before break" type having polarized armatures 42 and 46. When coil 41 carries positive current, armature 42 makes contact with contact 38A and armature 46 makes contact with contact 81. When coil 41 carries negative current, armature 42 makes contact with contact 80, and armature 46 makes contact with contact 38. Therefore, chopper 40 performs two functions: it impresses the output signal from transformer 36 on the rectifier 43 or 47, and it connects the armatures 42 and 46 to ground during the "no signal" period 27 illustrated in Figs. 2 to 4 and Fig. 5c. Such periodic grounding is necessary to avoid drifting potentials in the circuits connected to the armatures 42 and 46. Each relay 49 and 45 has two armatures 50, 51 and 52, 53, which normally are in the positions illustrated in Fig. 1 when there are no signals impressed on the relays. The armatures 50 and 52 are connected in series, over conductors 54, 55 and 56 to a source of potential 57, with a pilot light 58 included in this circuit. When relays 49 and 45 are both energized, pilot light 58 becomes energized, indicating that the voltage under test is within the high and low limits such as $$V_1 > 0 \text{ or } X - (E + e^+) < 0$$
$$V_2 < 0 \text{ or } X - (E - e^-) > 0$$

The armature 5 is connected in series with the pilot lights 60 and 61 which are both energized when armature 51 rests on contact 62, which is the case when relay 49 is de-energized. Therefore, there is an indication that voltage X is too low. The same type of circuit is also provided for indicating when voltage X is too high.

This circuit includes armature 53, contact 63 and pilot lights 61 and 64. If pilot lights 60 and 64 are eliminated and pilot light 61 is retained, only one indication will be present, i.e. "no go" when voltage X is outside the tolerance limits.

The operation of the comparator is as follows: as mentioned previously, the potentiometer arm 22 is first adjusted to make the voltage drop across resistor $R_6$ equal to voltage E if $R_4$ is made equal to $R_5$. In a more general case, $$\frac{R_4}{R_5}E = X$$

In order to set the position of the potentiometer arm 13 on resistor $R_4$, voltage X is made equal to the high limit desired in any given case, and then arm 13 is moved to the position which produces zero voltage signal on the grid of tube 31. Similarly, arm 14 is set on resistor $R_5$ to produce a zero signal on the grid of tube 31 when voltage X is made equal to the low limit desired in any given case. With the potentiometer arms set in the above manner, rectangular waves 26—28, having equal amplitudes, will be produced on the grid of tube 31 if X is in the middle of the two tolerance limits, that is to say, when $$X = \frac{E + e^+ + E - e^-}{2} \quad \text{or} \quad X = E + \frac{e^+ - e^-}{2}$$

When the unknown voltage X changes from high value to low value, the voltage impressed on the grid of tube 31 assumes a wave form illustrated in Fig. 5c. The rectangular waves 26a and 28a are both negative as long as the voltage X is larger than the high limit 509. When voltage X is equal to the high limit $E + e^+$ (point 509 in Fig. 5a) voltage $V_1$ is equal to zero (point 508) and $V_2$ is negative. $V_1$ then becomes positive while $V_2$ remains negative up to point 510, and then $V_1$ and $V_2$ become positive, as indicated by the waves 26b and 28b. The operation of the relays 45 and 49 can be made to take place by adjusting the positions of the arms 13 and 14 on the potentiometer.

When the signals have the wave forms 26a—28a and 26b and 28b, only one of them, having the proper polarity, will be passed by the rectifiers 43 and 47. When the wave 26a is impressed on rectifier 43, it will be blocked, and, therefore, relay 45 will remain de-energized. Relay 49 will be energized by wave 28a. Light 60 ("too low") and "no go" light 61 will be de-energized if two lights are used. Light 58 will remain de-energized and lights 61 and 64 energized because relay 45 is de-energized and only relay 49 is energized.

The reverse takes place when the waves 26b and 28b are impressed on the relays. Lights 60 and 61 become energized.

When the signals are of the type illustrated in Fig. 2, then relays 49 and 45 are both energized and the "go" signal 58 is energized while all the remaining lights are extinguished.

From the above description it follows that the disclosed system produces the "go" signal when X is within the limits, and either "too high" or "too low" signal when the X voltage is outside the limits. It may also provide a "no go" signal if X is either too low or too high.

The system also requires only two voltage comparisons, that between the limits $E + e^+$ and $E - e^-$ which are introduced on the input side of the comparator at the resistive network 11.

Figure 5:
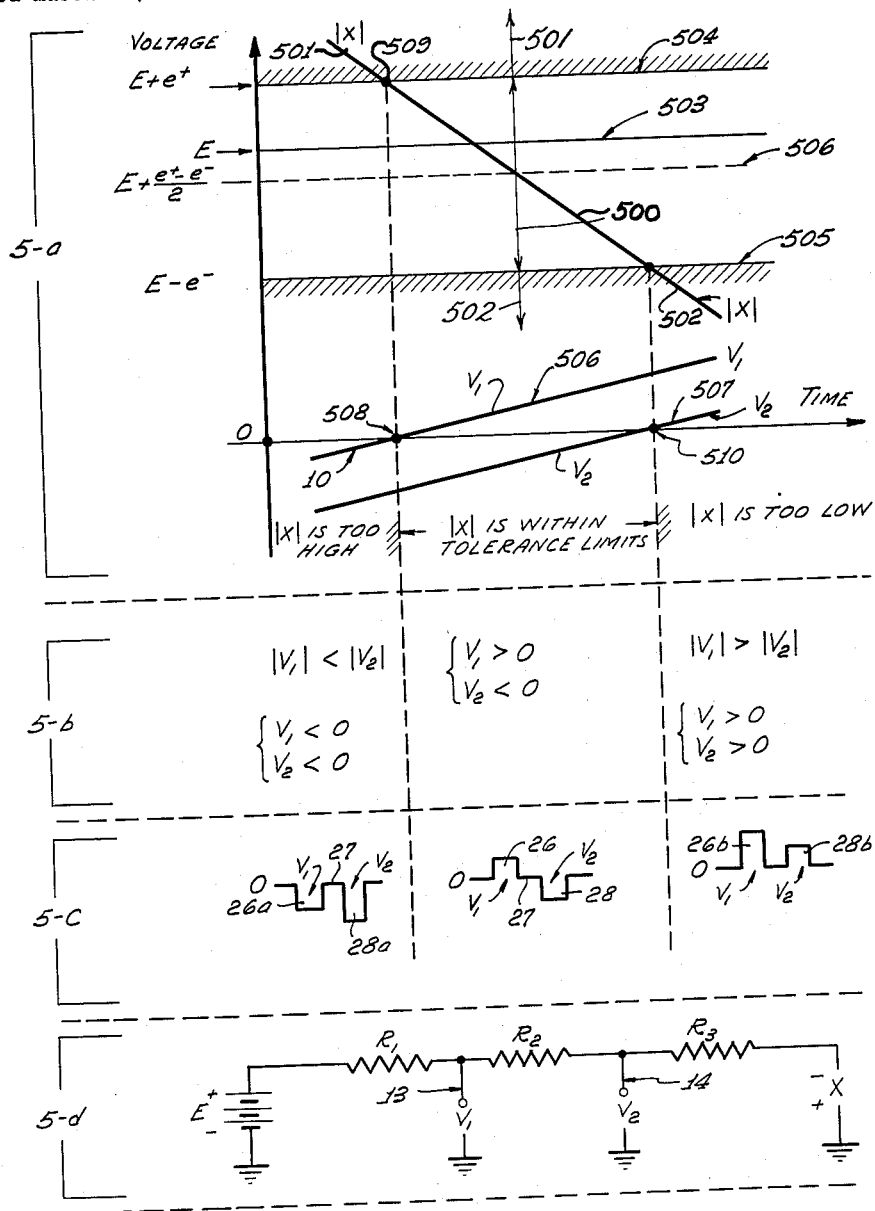
Figure 5 is an explanatory figure.

Figure 5 is a graphical summary of the description given above. Part (a) illustrates what happens to the voltages $V_1$ and $V_2$ appearing on contacts 13 and 14 (see part 5d) when the unknown voltage X varies between a high value 501 and low value 502, the variation being along a straight line 500 with respect to time, an arbitrary assumption. In Figure 5a it is also assumed that $e^+ < e^-$ in their absolute values, and, therefore, the position of the E line 503 is not half-way between the lines 504 and 505 which indicate the acceptable voltage limits. Line 506, half-way between the lines 504 and 505, has an ordinate equal to $$E + \frac{e^+ - e^-}{2}$$

The $V_1$ and $V_2$ lines, which are also marked as lines 506 and 507, indicate that $V_1$ is equal to zero at point 508, which corresponds to point 509 on line 500 when line 500 crosses line 504, i.e. when the voltage on contact 13, Fig. 5d, is equal to zero.

When $V_1$ is negative and the wave produced by $V_1$ is negative, as illustrated at 26a, relay 45 does not receive any current and remains de-energized. After point 508, relay 45 becomes energized since voltage $V_1$ produces positive waves 26 and 26b. Similarly, relay 49 is energized by the negative waves 28a and 28 up to point 510. Thereafter, the wave 28 becomes positive, as illustrated at 28b, and relay 49 remains de-energized. The pilot light 58 will be energized when relays 49 and 45 are closed. Light 61 will be energized when either relay 49 or 45, or both of these relays, are de-energized. Also, light 60 is energized only when the signal is too low, and relay 49 is open while relay 45 is closed. Light 64 is energized only when the signal is too high, and relay 45 is open while relay 49 is closed.

It may be seen that, as in every other system, this one presents two dead zones, one around $V_1=0$, another around $V_2=0$.

For these two values of X, $X=E+e^+$ or $X=E-e^-$, either relay 49 or relay 45 is not energized because one of the rectangular signals 26 or 28 is equal to zero.

However, these two dead zones may be made very small by using high gain amplifier and non-linear devices 70, 71 as thermistor or other limiters, in order to avoid overloading the relays 49 and 45, and to get a high overall gain for a small signal.

While the comparator has been illustrated and described in connection with the mechanical choppers 17 and 40, it is to be understood that the mechanical choppers can be replaced with the electronic choppers which are well-known in the chopper art. It should be also apparent that rectifiers 43, 47 and filters 44, 48 can be eliminated, in which case the direct current relays 49 and 45 are replaced with polarized relays which are energized by current of only one polarity and also may present a mechanical inertia large enough to make such relays act as integrators for the impressed rectangular waves.

What is claimed as new is:

1. A voltage comparator comprising a resistor, a first source of direct current reference voltage and a second source of direct current unknown voltage serially connected to said resistor, first and second potentiometer arms connected to said resistor, said sources being connected to said resistor with the terminals having opposite polarities, an amplifier, first means for connecting said amplifier first to said first potentiometer arm and then to said second potentiometer arm, two parallel indicator circuits, and second means for connecting said indicator circuits, one at a time and in synchronism with the operation of said first means, to the output of said amplifier for indicating whether said unknown voltage is within the predetermined tolerance voltage limits, $V_1$ and $V_2$, said voltages $V_1$ and $V_2$ being produced by said reference voltage and said unknown voltage on said first and second potentiometer arms, respectively, said indicator circuits including means for producing "too high," "too low" and "go" indications when the said unknown voltage is too high, too low and within said predetermined limits, respectively, said first and second means being first and second choppers connected to a common source of alternating current, whereby said choppers are synchronized in their operation, said second chopper having two polarized armatures and two contacts for each armature, one contact being grounded and the other contact being connected to its respective indicator circuit, each of said armatures making contact with its two contacts before breaking connection with one of them, whereby said armatures are make-before-break armatures.

2. A voltage comparator comprising a resistor, a first source of direct current reference voltage and a second source of direct current unknown voltage serially connected to said resistor, first and second potentiometer arms connected to said resistor, said sources being connected to said resistor with the terminals having opposite polarities, an amplifier, first means for connecting said amplifier first to said first potentiometer arm and then to said second potentiometer arm, two parallel indicator circuits, and second means for connecting said indicator circuits, one at a time and in synchronism with the operation of said first means, to the output of said amplifier for indicating whether said unknown voltage is within the predetermined tolerance voltage limits, $V_1$ and $V_2$, said voltages $V_1$ and $V_2$ being produced by said reference voltage and said unknown voltage on said first and second potentiometer arms, respectively, said indicator circuits including means for producing "too high," "too low" and "go" indications when the magnitude of said unknown voltage is too high, too low, and within the predetermined limits, respectively, each of said indicator circuits including serially connected rectifier, a filter, a non-linear current-limiting device and a relay.

3. A voltage comparator comprising a first source of reference voltage, a second unknown source of voltage, a resistance network connected to said first and second voltages, first and second potentiometer arms connected to said resistance network, said first arm normally having a voltage corresponding to the upper tolerance limit for said second voltage, and said second arm normally having a voltage corresponding to the lower tolerance limit for said second voltage so long as said second voltage has a value corresponding to said limits, an alternating current amplifier, first switching means for connecting said amplifier first to said first arm and then to said second arm, a second switching means connected to the output of said amplifier, and first and second parallel indicator circuits connectable to the output of said amplifier by a second switching means, said first indicator circuit having means for indicating when said second voltage is too high, said second indicator circuit having means for indicating when said second voltage is too low, and said first and second indicator circuits also having, in combination, means for indicating when said second source is within said upper and lower tolerance limits, said first and second potentiometers being separated by a resistance $R_2$, said first arm and said first source being separated by a resistance $R_1$, and said second arm and said second source being separated by a resistance $R_3$, the values of said resistances being derived from the following equations:

$$\frac{R_3+R_2}{R_1}=1+\frac{e^+}{E}; \quad \frac{R_3}{R_1+R_2}=1-\frac{e^-}{E}$$

where E is the reference voltage; $e^+$ is the voltage increment for the upper tolerance voltage; $e^-$ is the voltage decrement for the lower tolerance voltage.

4. A voltage comparator circuit comprising a resistor having first and second potentiometer arms connected to said resistor, a source of direct current reference voltage connected to one end of said resistor and a source of unknown direct current voltage under test connected to the other end of said resistor with the polarity opposite to the polarity of said reference voltage, whereby said sources form a series circuit through said resistor, an amplifier, first and second switching means, first and second test channels, and means for synchronously operating said first and second switching means for connecting first said first potentiometer arm to said first test channel through said amplifier, and then said second potentiometer arm to said second test channel through said amplifier, said first and second switching means each including means for connecting the input side of said amplifier and the input sides of both of said test channels to ground before connecting them to the first and second potentiometer arms.

5. A voltage comparator circuit comprising a resistor having first and second potentiometer arms connected to said resistor, a source of direct current reference voltage connected to one end of said resistor and a source of unknown direct current voltage under test connected to the other end of said resistor with the polarity opposite to the polarity of said reference voltage, whereby said sources form a series circuit through said resistor, an amplifier, first and second switching means, first and second test channels, and means for synchronously operating said first and second switching means for connecting first said first potentiometer arm to said first test channel through said amplifier, and then said second potentiometer arm to said second test channel through said amplifier, each of said test channels including the following series circuit: a rectifier, a filter, a non-linear device and a relay winding, each of said relays having two armatures connected in a common indicating circuit, said circuit having visual means for producing "go," "too high" and "too low" indications corresponding to the magnitude of said unknown voltage.

References Cited in the file of this patent

UNITED STATES PATENTS

| | | |
|---|---|---|
| 2,060,849 | Bullard | Nov. 17, 1936 |
| 2,468,625 | Goetz | Apr. 26, 1949 |
| 2,470,067 | Callender et al. | May 10, 1949 |
| 2,505,072 | Sunstein | Apr. 25, 1950 |
| 2,509,850 | Von Mulinen | May 30, 1950 |
| 2,528,214 | Dome | Oct. 31, 1950 |
| 2,553,629 | Behr | May 22, 1951 |
| 2,672,601 | Welby | Mar. 16, 1954 |
| 2,676,253 | Ayres | Apr. 20, 1954 |
| 2,684,479 | Hill et al. | July 20, 1954 |
| 2,700,759 | Ogle et al. | Jan. 25, 1955 |
| 2,715,718 | Holtje | Aug. 16, 1955 |
| 2,740,108 | Plymyton et al. | Mar. 27, 1956 |

FOREIGN PATENTS

| | | |
|---|---|---|
| 635,852 | Great Britain | Apr. 19, 1950 |